(12) United States Patent
Otero et al.

(10) Patent No.: US 9,805,016 B2
(45) Date of Patent: Oct. 31, 2017

(54) TECHNIQUES TO PRESENT A DYNAMIC FORMULA BAR IN A SPREADSHEET

(71) Applicant: MICROSOFT TECHNOLOGY LICENSING, LLC, Redmond, WA (US)

(72) Inventors: Carlos Otero, Seattle, WA (US); John Campbell, Woodinville, WA (US); Uhl Albert, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 249 days.

(21) Appl. No.: 14/060,537

(22) Filed: Oct. 22, 2013

(65) Prior Publication Data

US 2015/0113378 A1   Apr. 23, 2015

(51) Int. Cl.
*G06F 17/24* (2006.01)

(52) U.S. Cl.
CPC ................... *G06F 17/246* (2013.01)

(58) Field of Classification Search
CPC ...... G06F 17/246; G06F 17/211; G06F 17/24; G06F 3/04847; G06F 17/241; G06F 3/0488
See application file for complete search history.

(56) References Cited

U.S. PATENT DOCUMENTS

| | | | | |
|---|---|---|---|---|
| 5,644,737 A | * | 7/1997 | Tuniman et al. | 715/810 |
| 5,721,847 A | * | 2/1998 | Johnson | 715/786 |
| 5,848,187 A | * | 12/1998 | Bricklin et al. | 382/187 |
| 5,893,125 A | * | 4/1999 | Shostak | G06F 17/30595 715/205 |
| 6,055,548 A | * | 4/2000 | Comer et al. | 715/212 |
| 6,199,078 B1 | * | 3/2001 | Brittan et al. | 715/234 |
| 6,256,649 B1 | * | 7/2001 | Mackinlay | G06F 17/246 345/473 |
| 7,120,866 B2 | | 10/2006 | Kotler et al. | |
| 7,155,667 B1 | | 12/2006 | Kotler et al. | |

(Continued)

OTHER PUBLICATIONS

Weylock, Bill, "Real Geek Forums—Is Formula Bar Floating Going to be Fixed?", retrieved from <http://www.realgeek.com/forum/is-formula-bar-floating-going-to-be-fixed-430834.html>, Feb. 18, 2008, 6 pages.

(Continued)

*Primary Examiner* — Wilson Tsui

(57) ABSTRACT

Various embodiments are generally directed to techniques and apparatuses to present a dynamic formula bar in a spreadsheet application. Some embodiments are particularly directed to presenting a dynamic formula bar in a spreadsheet application that may improve usability in particular with large display sizes and/or touchscreen interfaces. In one embodiment, for example, an apparatus may comprise a processor circuit and a spreadsheet user interface (UI) component executing on the processor circuit to present a grid comprising cells arranged in rows and columns. The spreadsheet UI component may include a formula bar interface component operative to display a formula bar UI element adjacent to a first cell in response to receiving a control directive selecting the first cell. Other embodiments are described and claimed.

20 Claims, 17 Drawing Sheets

(56) References Cited

U.S. PATENT DOCUMENTS

| | | | |
|---|---|---|---|
| 7,290,219 B2* | 10/2007 | Boyles | G06F 3/04842 715/212 |
| 7,590,944 B2 | 9/2009 | Weber et al. | |
| 7,805,674 B2 | 9/2010 | Chen et al. | |
| 2002/0099743 A1 | 7/2002 | Workman et al. | |
| 2002/0118221 A1* | 8/2002 | Hudson et al. | 345/711 |
| 2003/0051209 A1* | 3/2003 | Androski et al. | 715/503 |
| 2006/0212469 A1* | 9/2006 | Babanov et al. | 707/102 |
| 2006/0282818 A1* | 12/2006 | DeSpain | 717/109 |
| 2008/0104505 A1* | 5/2008 | Keohane et al. | 715/246 |
| 2009/0044090 A1* | 2/2009 | Gur | G06F 17/246 715/212 |
| 2010/0083089 A1* | 4/2010 | Rapp et al. | 715/217 |
| 2010/0125804 A1* | 5/2010 | O'Dea | 715/767 |
| 2011/0055697 A1 | 3/2011 | Davidson et al. | |
| 2011/0125594 A1* | 5/2011 | Brown et al. | 705/14.73 |
| 2014/0189482 A1* | 7/2014 | Hill | 715/212 |

OTHER PUBLICATIONS

"International Search Report and Written Opinion for PCT Patent Application No. PCT/US2014/060986", mailed Mar. 18, 2015, 10 Pages.

"iWork Formulas and Functions User Guide", Chapter 1: Using Formulas in Tables, <http://manuals.info.apple.com/en_US/Formulas_and_Functions_User_Guide.pdf>, Retrieved on: Jul. 15, 2013, (Author unknown), pp. 15-32.

* cited by examiner

User Interface View 300

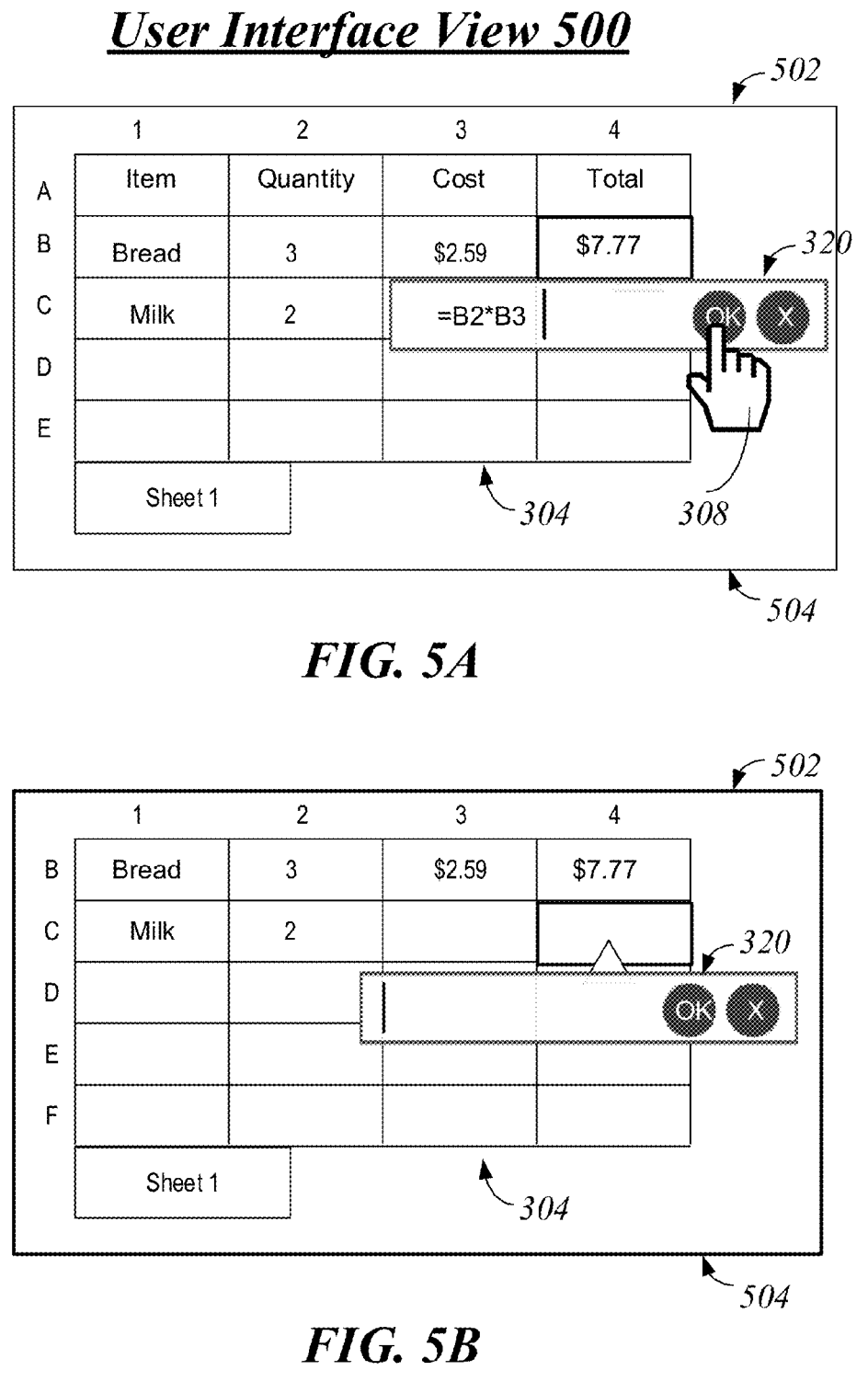

User Interface View 500

|   | 1 | 2 | 3 | 4 |
|---|---|---|---|---|
| A | Item | Quantity | Cost | Total |
| B | Bread | 3 | $2.59 | $7.77 |
| C | Milk | 2 | =B2*B3 | |
| D | | | | |
| E | | | | |

Sheet 1

FIG. 5A

|   | 1 | 2 | 3 | 4 |
|---|---|---|---|---|
| B | Bread | 3 | $2.59 | $7.77 |
| C | Milk | 2 | | |
| D | | | | |
| E | | | | |
| F | | | | |

Sheet 1

FIG. 5B

*User Interface View 600*

| | 1 | 2 | 3 | 4 | |
|---|---|---|---|---|---|
| A | | | | | |
| B | Item | Quantity | Cost | Total | $7.77 B4 |
| C | Bread | 3 | $2.59 | =B2*B3 | =B2*B3 |
| D | Milk | 2 | | | |
| E | | | | | |
| | Sheet 1 | | | | |

*FIG. 6C*

User Interface View 700

|   | 1 | 2 | 3 | 4 |
|---|---|---|---|---|
| A | Item | Quantity | Cost | Total |
| B | Bread | 3 | $2.59 | $7.77 |

=B2*B3   OK X  ← 720

|   | 1 | 2 | 3 | 4 |
|---|---|---|---|---|
| C | Milk | 2 | | |
| D | | | | |

Sheet 1

*FIG. 7A*

|   | 1 | 2 | 3 | 4 |
|---|---|---|---|---|
| A | Item | Quantity | Cost | Total |
| B | Bread | 3 | $2.59 | $7.77 |
| C | Milk | 2 | | |

OK X  ← 720

| D | | | | |

Sheet 1

*FIG. 7B*

User Interface View 800

User Interface View 900

FIG. 9A

|   | 1 | 2 | 3 | 4 |
|---|---|---|---|---|
| A | Item | Quantity | Cost | Total |
| B | Bread | 3 | $2.59 | $7.77 |
| C | Milk | 2 | | |
| D | | Sheet 2 | =B2*B3 | |
| E | Sheet 1 | | | |

FIG. 9B

|   | 1 | 2 | 3 | 4 |
|---|---|---|---|---|
| A | Item | Quantity | Cost | Total |
| B | Bread | 3 | $2.59 | $0.18 |
| C | Milk | 2 | $3.49 | |
| D | | ... | =(B2*B3)/(C2+C3)*8 | |
| E | Sheet 1 | | | |

User Interface View 1000

|   | 1 | 2 | 3 | 4 |
|---|---|---|---|---|
| A | Item | Quantity | Cost | Total |
| B | Bread | 3 | $2.510 | $7.77 |
| C | Milk | 2 | | |
| D | | | | |
| E | | | | |

B4  =B2*B3   OK  X

| = | Esc | = | Σ | fx | : | 7 | 8 | 10 |
| + | Avg | , | ( | ) | " | 4 | 5 | 6 |
| - | * | / | < | > | $ | 1 | 2 | 3 |
| | | | | | | | 0 | Ent |

```
PRESENT A GRID COMPRISING CELLS ON A DISPLAY
1302

RECEIVE A CONTROL DIRECTIVE SELECTING A CELL
1304

DISPLAY A FORMULA BAR UI ELEMENT ADJACENT TO THE
SELECTED CELL
1306

ACCEPT INPUT TO THE CELL FROM THE FORMULA BAR UI
ELEMENT
1308
```

*FIG. 13*

TECHNIQUES TO PRESENT A DYNAMIC FORMULA BAR IN A SPREADSHEET

BACKGROUND

Spreadsheet applications have long been used to organize and manipulate sets of data, typically, but not limited to, numeric data. A spreadsheet is usually in table form, having a grid of rows and columns of cells. Each cell usually represent one element of data. A cell can hold text data, numeric data, date/time data and so forth. The value of a cell can be entered directly, or can be entered as the result of a calculation or formula. In order to make viewing the data manageable, the cells are normally relatively small. A formula bar is often provided somewhere in the interface, typically docked at the top or bottom of the spreadsheet, to show the entire contents of a cell, which can be useful when the display size of the contents exceeds the display size of the cell. The formula bar may also display the formula or calculation associated with a cell while the cell may display the calculated value. The formula bar developed when most spreadsheets were used on desktop computers with moderate display sizes and input devices such as keyboards and mice and track pads. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to present a dynamic formula bar in a spreadsheet application. Some embodiments are particularly directed to techniques to present a dynamic formula bar in a spreadsheet application that may improve usability in particular with large display sizes and/or touchscreen interfaces. In one embodiment, for example, an apparatus may comprise a processor circuit and a spreadsheet user interface (UI) component executing on the processor circuit to present a grid comprising cells arranged in rows and columns. The spreadsheet UI component may include a formula bar interface component operative to display a formula bar UI element adjacent to a first cell in response to receiving a control directive selecting the first cell. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIGS. 3A-B illustrate an embodiment of a first user interface view for the system of FIG. 1.

FIGS. 5A-B illustrate an embodiment of a third user interface view for the system of FIG. 1.

FIGS. 6A-C illustrate an embodiment of a fourth user interface view for the system of FIG. 1.

FIG. 7A-B illustrate an embodiment of a fifth user interface view for the system of FIG. 1.

FIG. 9A-B illustrate an embodiment of a seventh user interface view for the system of FIG. 1.

FIG. 10 an embodiment of a eight user interface view for the system of FIG. 1.

FIG. 13 illustrates an embodiment of a logic flow for the system of FIG. 1.

DETAILED DESCRIPTION

Figure 1:
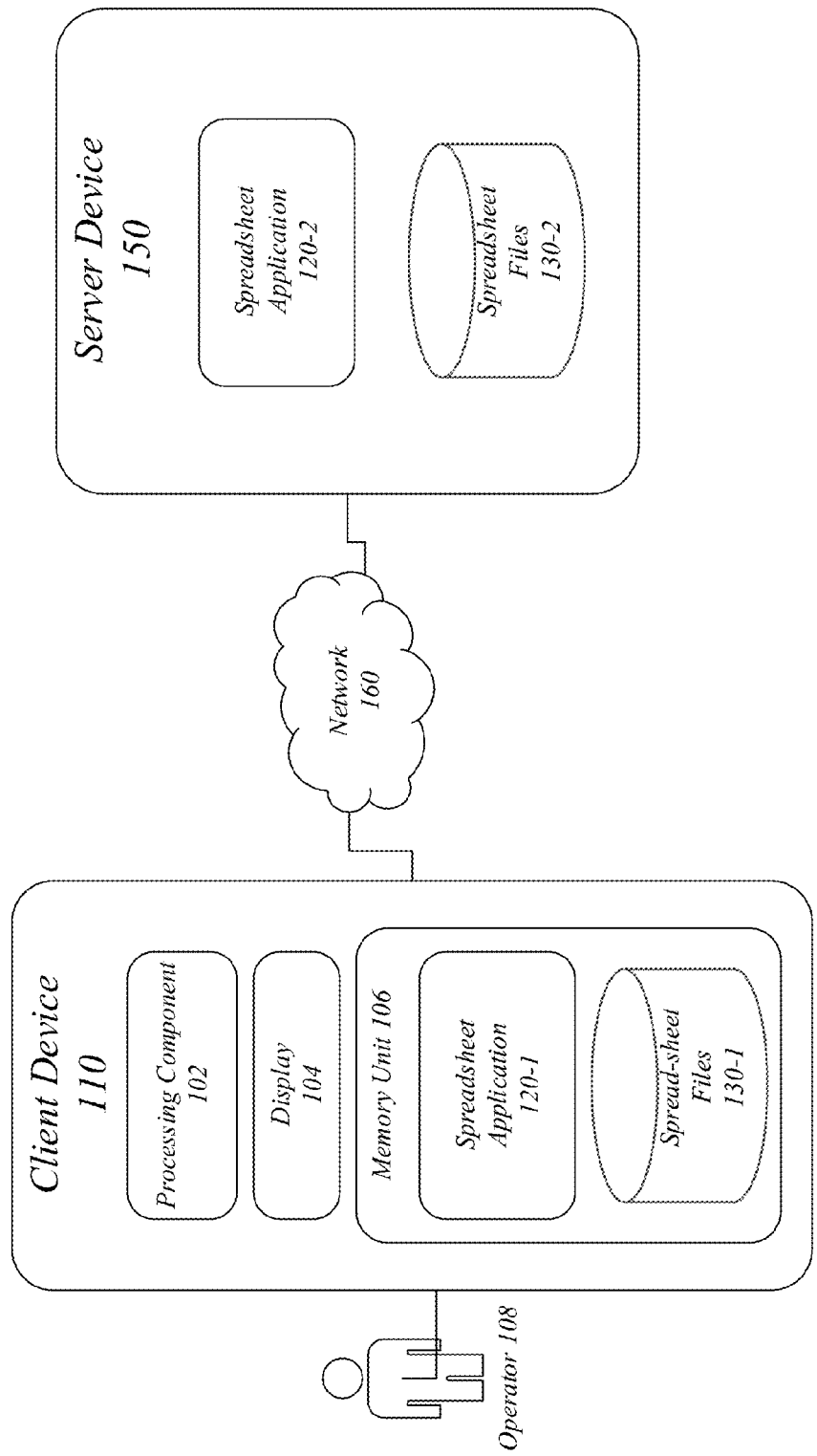
FIG. 1 illustrates an embodiment of a system to present a dynamic formula bar in a spreadsheet application.

Various embodiments are directed to techniques to present a dynamic formula bar in a spreadsheet application. Increasing display sizes for computing devices, as well as the spread of touch interface computing devices have rendered the conventional spreadsheet formula bar less useful. Navigating from a selected cell to a static formula bar at the top or bottom of the screen on a large display takes extra time and motion on the part of the operator. On a tablet computing device or smart phone, or other touch interface devices, the conventional formula bar may be physically closer to the cells, but may not be optimally placed for the user.

Embodiments provide a dynamic and movable formula bar for a spreadsheet application that can be displayed adjacent to a selected cell, and that can be moved or docked according to the operator's choice. Embodiments may also provide a dynamically positioned and sized formula bar. As a result, the embodiments can improve efficiency and user experience for the operators of a spreadsheet.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates an embodiment of a system 100 to present a dynamic formula bar in a spreadsheet application. In one embodiment, system 100 may comprise a computer-implemented system 100 having a client device 110 that includes one or more components, such as a processing component 102, a display 104, and a memory unit 106. System 100 may optionally comprise a server device 150 in communication with client device 110 via a network 160. Although the system 100 shown in FIG. 1 has a limited number of elements in a certain topology, it may be appreciated that the system 100 may include more or less elements in alternate topologies as desired for a given implementation.

The system 100 may comprise client device 110. Client device 110 may include any electronic device capable of receiving, processing, and sending information for system 100. Examples of an electronic device may include, without limitation, an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

Client device 110 may execute processing operations or logic for the system 100 using a processing component 102. Processing component 102 may comprise various hardware elements. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth.

Client device 110 may include a display 104. Display 104 may be integrated into client device 110, or may be separate but communicatively coupled to client device 110. Display 104 may include a touch-sensitive surface that can detect a touch gesture, which may include contact with items such as a human fingertip, a stylus, an electronic pen, and so forth. Display 104 may, in particular, be able to detect at least one of a location, an amount of pressure, a speed of movement, and a direction of movement of a touch gesture. Display 104 may also include conventional computer monitors or integrated laptop computer screens that may or may not be touch-sensitive. In the case of a touch insensitive display, a touch gesture, as used herein, may refer to a control directive received, for example, via a computer mouse and its cursor as presented on display 104.

Client device 110 may include one or more memory units 106. A memory unit 106 may include various computer-readable storage devices, volatile and non-volatile, that store data and instructions for retrieval by processing component 102. As used herein, a memory unit 106 does not include signals or carrier waves, such as electromagnetic or optical waves. Memory units are described further with respect to FIG. 13.

Client device 110 may include instructions that are executable by processing component 102 to perform various operations. The instructions may include, without limitation, instructions for spreadsheet application 120, as well as user interface logic and an operating system (not shown). Examples of instructions may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Spreadsheet application 120-1 may provide the operations and interfaces of a spreadsheet. Examples of a spreadsheet application 120-1 may include, without limitation, MICROSOFT EXCEL® from MICROSOFT CORPORATION, NUMBERS® from APPLE INC., and GOOGLE DOCS spreadsheets from GOOGLE INC. Spreadsheet application 120-1 may allow an operator, e.g. operator 108, to enter, organize, sort, manipulate, calculate and otherwise interact with data of various types in tabular form.

Spreadsheet application 120-1 may be a stand-alone application on client device 110, or may be a client-side interface that interacts with a server-side spreadsheet application 120-2. For example, server-side spreadsheet application 120-2 may be a cloud-based spreadsheet application that provides the functions, interface, and storage for a spreadsheet application over network 160 to client side spreadsheet application 120-1. From the perspective of operator 108, a cloud-based application appears as though it is a locally installed and executed application. Spreadsheet application 120-1 is described in further detail with respect to FIG. 2.

Client device 10 may store spreadsheet files 130-1, which may save the data, formulas, formatting, and so forth for one or more discrete spreadsheets on a local storage medium, e.g. memory unit 106.

Server device 150, in an embodiment, may be an electronic device capable of communicating with client device 110. Server device 150 may include a spreadsheet application 120-2 and/or spreadsheet files 130-2. As described, spreadsheet application 120-2 may be a cloud-based application, or may otherwise provide some or all spreadsheet functions and operations for spreadsheet application 120-1. Spreadsheet files 130-2 may be files created and modified by operator 108 using spreadsheet application 120-1 but stored remotely from client device 110.

Figure 2:
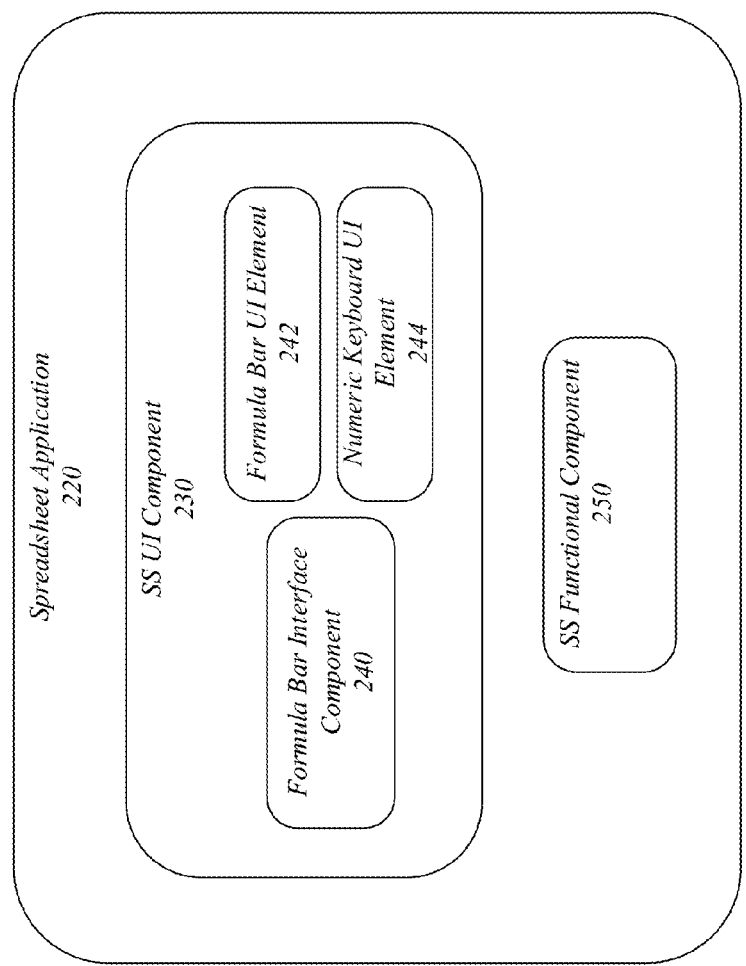
FIG. 2 illustrates an embodiment of an operating environment for the system of FIG. 1.

FIG. 2 illustrates an embodiment of an operating environment 200 for the system of FIG. 1. Operating environment 200 may include, in particular, a spreadsheet application 220. Spreadsheet application 220 may be an embodiment of spreadsheet application 120-1, spreadsheet application 120-2, or a combination of spreadsheet applications 120-1, 120-2.

As shown in FIG. 2, spreadsheet application 220 may include a variety of functional components, such as, but not limited to, a spreadsheet (SS) user interface (UI) component 230 and a SS functional component 250. Additional and/or alternative components may also be in included in spreadsheet application 220. The functional components as described herein may include software that when executed on a processing circuit, e.g. processing component 102, provides the functionality described.

SS UI component 230 may include functions that provide the user interface to spreadsheet application 220, such as the menu bars, grid lines, data displays, dialog boxes, and so forth, that allow operator 108 to interact with spreadsheet application 220. SS UI component 230 may present a grid comprising cells arranged in rows and columns. In particular, SS UI component 230 may include a formula bar interface component 240, a formula bar UI element 242 and a numeric keyboard UI element 244.

Formula bar interface component 240 may display formula bar UI element 242 adjacent to a cell in the grid in response to receiving a control directive selecting the cell. Formula bar UI element 242 may include an element having an entry field that may display the current content (if any) of a selected cell, and/or accept input to the selected cell, e.g. from a keyboard, keypad, touchscreen keyboard and so forth. Numeric keyboard UI element 244 may provide an on-display numeric keypad, e.g. a 10-key keypad or calculator-like interface. Numeric keypad UI element 244 may accept input, for example, from a physical keyboard, a mouse or input device selection of the displayed keys, a touch input, and so forth. Further examples of the formula bar interface component 240's operations are illustrated in the following figures.

SS functional component 250 may include the instructions that when executed provide the spreadsheet functionality. SS functional component 250 may, for example, perform calculations, sorting, filtering, graphing, and any other spreadsheet operations. The embodiments are not limited to these examples.

FIGS. 3-9 illustrate various embodiments of user interfaces that may be provided by a spreadsheet application 120, 220, for example by SS UI component 230 using formula bar interface component 240. The embodiments of user interfaces provided by system 100 are not limited to these examples.

Figures 3A, 3B:
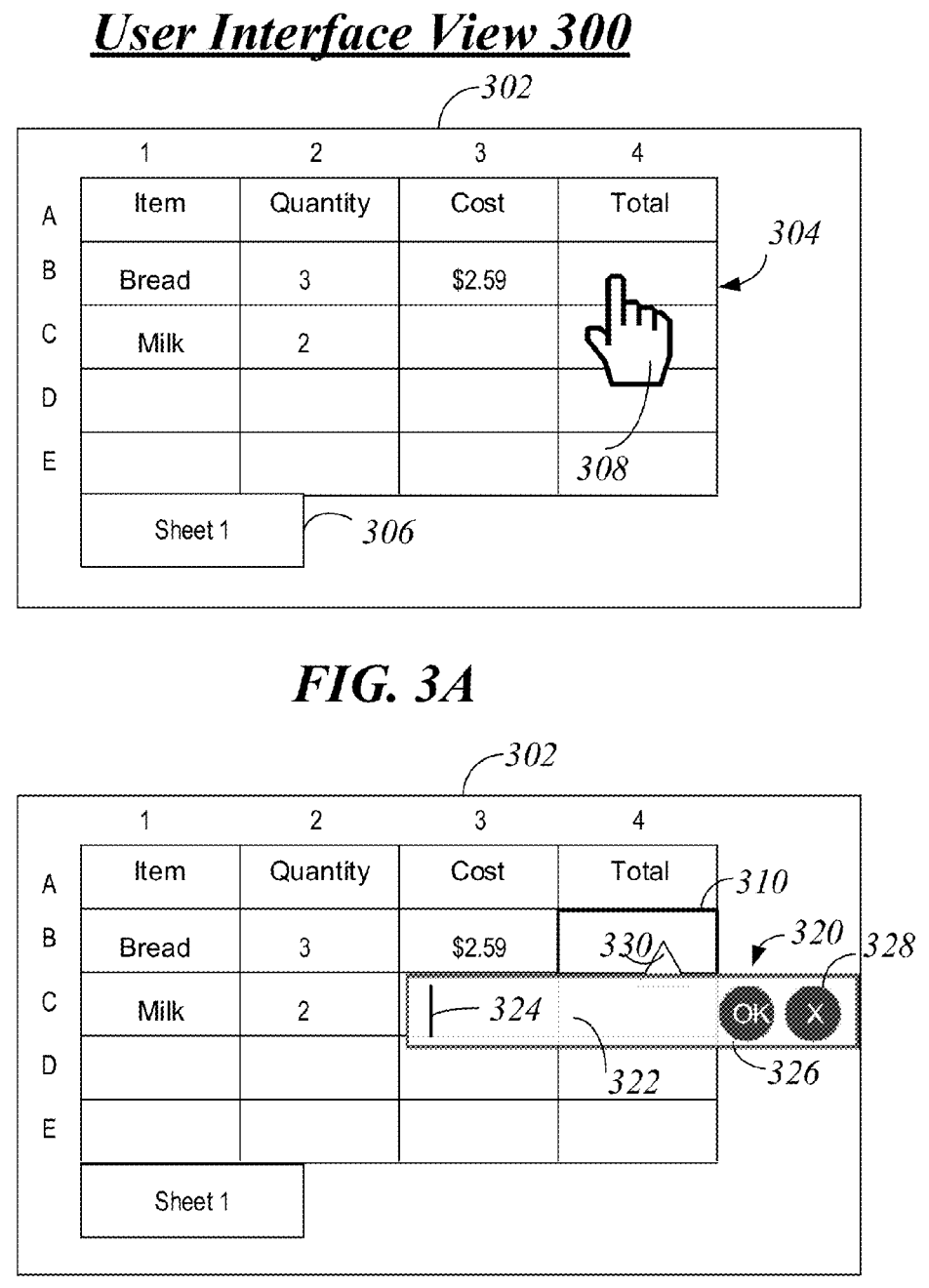

FIGS. 3A-B illustrate an embodiment of a first user interface view 300 for the system of FIG. 1. FIGS. 3A-B illustrate a before and after view of a spreadsheet, e.g. a spreadsheet 130, when a formula bar UI element is invoked. Generally, like-numbered elements represent the same or equivalent elements among these figures.

FIG. 3A illustrates a spreadsheet 302 having a grid 304. Grid 304 shows four columns labeled 1, 2, 3, and 4, and five rows labeled A, B, C, D, and E. A cell in grid 304 may be referenced according to its row and column coordinates. For example, the cell containing the text 'Bread' may be referred to herein as cell "B1." Grid 304 may represent one sheet of many in spreadsheet 302, and may be brought to the top of a plurality of sheets by selecting the tab 306. Other sheets are not shown in FIG. 3A.

As shown in FIG. 3A, an operator, e.g. operator 108, may select a cell, e.g. cell B4. The selection, represented by icon 308, may be received, for example, by an input device selection, e.g. a mouse single-click or keyboard key press, by a touch from a finger tip or stylus on a touch-sensitive display screen, by a gesture, a spoken command, or any other selection operation. Such a selection may be referred to herein as receiving a control directive to select a cell.

FIG. 3B illustrates spreadsheet 302 once cell B4 is selected. The cell B4 itself may display an indication that it is selected, e.g. with a darker and/or thicker border 310, a different fill color or highlight color, and so forth. Upon selection, formula bar UI element 320 (also referred to herein as "formula bar 320") may be displayed adjacent to the selected cell B4. In various embodiments, "adjacent to" may mean that formula bar 320 is immediately above, below, to the right of or to the left of the selected cell, but without obscuring the selected cell itself. In some embodiments, in addition to selecting the cell, an additional input may be needed before the formula bar UI element 320 is opened, e.g. an additional mouse click, selecting an "=" key or an "enter" key on a keyboard.

Formula bar 320 may include entry field 322, which may display an insertion cursor 324. Note that in FIG. 3A, cell B4 does not yet have a value or contain content, so entry field 322 is blank. If cell B4 had a value or content, entry field 322 may display some or all of the value or content of cell B4.

Formula bar 320 may include a commit button 326 and a cancel button 328. Commit button 326, when selected by a selection control directive, may associate and store (e.g. in spreadsheet file 130) the contents of entry field 322 with the selected cell such that the selected cell retains the contents even when another cell is selected instead. Cancel button 328 may close or move formula bar 320 without committing the contents, or changes to the contents, of entry field 322. Committing and canceling may be performed by other types of control directives, for example, by using an "enter" key or an "esc" key, respectively. The embodiments are not limited to these examples.

Formula bar 320 may further include a visual indicator 330 of which cell it is currently displaying the contents for, e.g. a pointer which points to selected cell B4. This may help the operator by distinguishing which cell contents are displayed when formula bar 320 is adjacent to several cells.

On a tablet, smart phone or other electronic device having a touch screen, opening formula bar 320 may also open an on-screen "soft" keyboard (not shown). In this scenario, the formula bar 320 may be relatively nearer the soft keyboard, reducing the distance between keyboard input and formula bar touch gestures, as compared to a permanently docked formula bar, for example, at the top of the display.

Figure 4A:
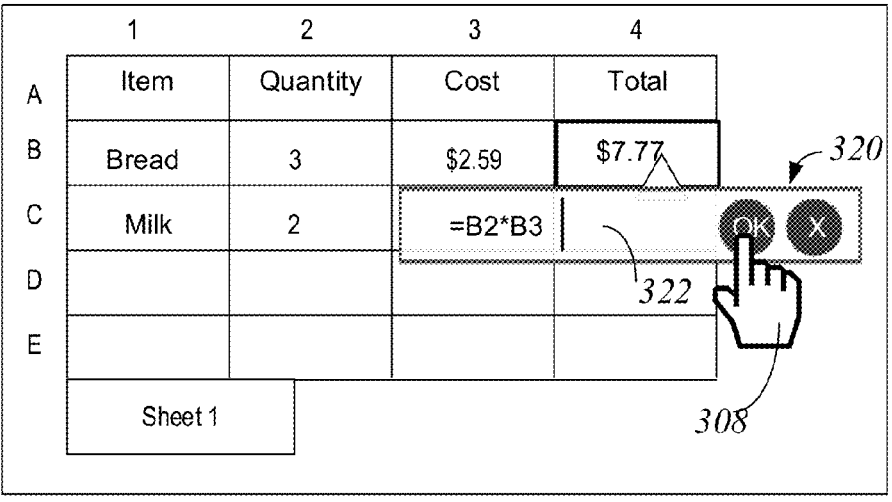
FIGS. 4A-B illustrate an embodiment of a second user interface view for the system of FIG. 1.
Figure 4B:
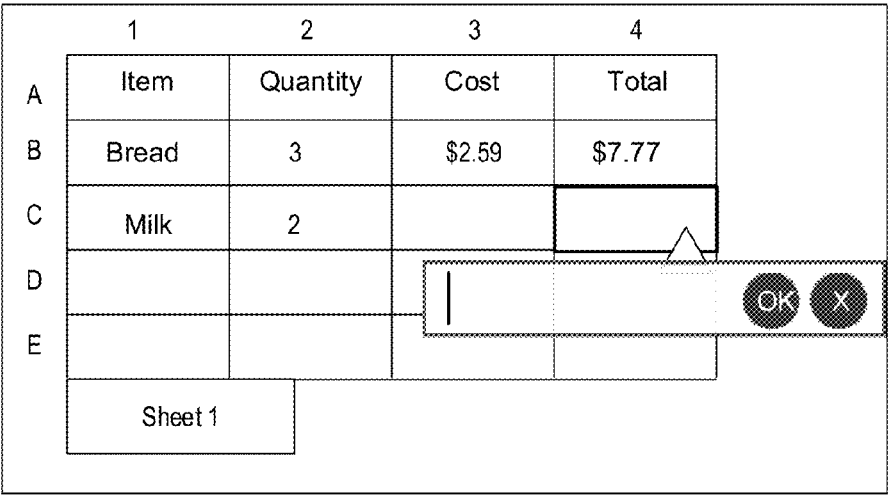

FIGS. 4A-B illustrate an embodiment of a second user interface view 400 for the system of FIG. 1. FIGS. 4A-B illustrate a before and after view of a spreadsheet, e.g. a spreadsheet 130, when a formula bar UI element is used to commit the contents of a selected cell.

FIG. 4A is similar to FIG. 3B and shows that a formula has been entered into entry field 322 of formula bar 320. In the illustrated example, the formula is "=B2*B3." This indicates that the value of selected cell B4 will be determined by the calculation of the value of cell B2 multiplied by the value of cell B3, e.g. 3×$2.59. In an embodiment, a preview of the calculated value of the cell may be shown directly in the cell and may be updated when changes are made to the formula displayed in formula bar 320.

Icon 308 indicates that the commit button 326 received a committing control directive to commit the contents of entry field to selected cell B4. Other methods of committing the contents are also possible.

FIG. 4B illustrates an embodiment of how formula bar 320 may behave in response to a committing control directive. In the illustrated embodiment, formula bar 320 may move to a next adjacent cell, e.g. to cell C4. In other embodiments, formula bar 320 may move to any of adjacent cells B3, A4, or, if there is a column 5, to cell B5. Note that formula bar 320 remains open and ready for input adjacent to the newly selected cell, rather than closing and forcing the operator to reopen the formula bar.

FIGS. 5A-B illustrate an embodiment of a third user interface view 500 for the system of FIG. 1. FIGS. 5A-B illustrate another before and after view of a spreadsheet, e.g. a spreadsheet 130, when a formula bar UI element is used to commit the contents of a selected cell.

FIG. 5A is similar to FIG. 4A. Of note is that formula bar 320 is adjacent to and below selected cell B4, and is approximately halfway between a top display border 502 and a bottom display border 504. The top display border 502 and bottom display border 504 may represent the top and bottom edges of a UI element that displays spreadsheet 302, e.g. a window, or may represent the actual top and bottom edges of a physical display screen, for example, when spreadsheet 302 is displayed in a full screen mode.

FIG. 5B illustrates another embodiment of how formula bar 320 may behave in response to a committing control directive. When the contents of selected cell B4 are committed in FIG. 5A, instead of moving the formula bar 320 to an adjacent cell, in FIG. 5B, the grid itself is moved, e.g. scrolled or panned, with respect to formula bar 320 and the top and bottom borders 502 and 504. Note that row A is no longer visible and that row F is now visible at the bottom of the grid. Formula bar 320 remains in the same position relative to top display border 502 and bottom display border 504, and is now associated with a cell (C4) adjacent to the previously selected cell (B4). As in FIG. 4B, formula bar 320 remains open and ready for input.

Figure 6A:
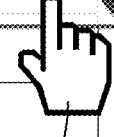
Figure 6B:

FIGS. 6A-C illustrate an embodiment of a fourth user interface view 600 for the system of FIG. 1. FIGS. 6A-C illustrate two possible embodiments of docking operations for a formula bar UI element. The embodiments are not limited to these examples. A formula bar UI element may be docked to a variety of other UI elements without limitation.

FIG. 6A is similar to FIG. 4A. Of note is a docking control directive, indicated by icon 308. A docking control directive may include, without limitation, a select and drag motion, a menu selection, or a selection of some UI element that causes formula bar 320 to cease floating over grid 304 and dock to a side of grid 304. In the illustrated example, the docking control directive is a select and drag motion received, e.g. from a finger tip touch to a touch sensitive display, or a mouse click and drag.

FIG. 6B illustrates the formula bar 320 after it is docked at the bottom after a motion toward the bottom side of grid 304. In the illustrated example, formula bar 320 is docked adjacent to tab 306. In a docked position, formula bar 320 may lose visual indicator 330 and include an indicator 602 of which cell is currently selected. In the docked position, formula bar 320 may no longer move in response to committing control directives. However, formula bar 320, unlike conventional formula bars, may be undocked and become floating in response to an undocking control directive. While FIG. 6B shows formula bar 320 docked at the bottom of grid 304, formula bar 320 may be analogously docked at the top of grid 304.

FIG. 6C illustrates another docking position for formula bar 320, e.g. to the right side of grid 304. Formula bar 320 may have been docked on the right from floating as in FIG. 6A, or from being undocked from the bottom as in FIG. 6B and moved to another docking position. Docked formula bar 320 may include indicator 602 of which cell is currently selected, and may display, in field 604, the calculated value of the selected cell, when the selected cell value is determined from a calculation. In an embodiment, when docked to the left or to the right of grid 304, entry field 322 may be comparatively larger than when floating or docked on the top or bottom. This may be useful, for example, when the cell includes a larger amount of text, or is determined from a more complex formula.

Embodiments may also allow the formula bar to be repositioned with respect to its associated cell, for example, with a select and drag gesture (not shown). When repositioned, visual indicator 330 may change shape and/size to maintain the connection between the formula bar and the associated selected cell.

FIGS. 7A-B illustrate an embodiment of a fifth user interface view 700 for the system of FIG. 1. FIGS. 7A-B illustrate another docking position for a formula bar UI element.

FIG. 7A illustrates that a formula bar UI element 720 (hereinafter "formula bar 720") may be docked between two rows of grid 304, as shown, between rows B and C. Formula bar 720 may begin as floating, e.g. as in FIG. 3B, and may be docked between rows in response to a docking control directive. Alternatively, formula bar 720 may be docked between rows by default and may be undocked to float in response to an undocking control directive. When docked between rows, formula bar 720 does not cover any data.

FIG. 7B illustrates an embodiment of a behavior of formula bar 720 when a committing control directive is received. As illustrated, formula bar 720 may, in response to a committing control directive, move down to a next lower row. As shown, in FIG. 7B, formula bar 720 moves from between rows B and C to between rows C and D. Further, formula bar 720 may now be associated with cell C4, as shown by visual indicator 330. When a different cell in the same row, e.g. row C, is selected visual indicator 330 may move with respect to the ends of formula bar 720 to point to the selected cell.

In another embodiment, not illustrated, instead of moving to a next lower row, formula bar 720 may remain fixed with respect to the top and bottom borders of the display, and grid 304 may move up or down to position a newly selected cell at visual indicator 330, analogously to FIGS. 5A-B.

Figure 8A:
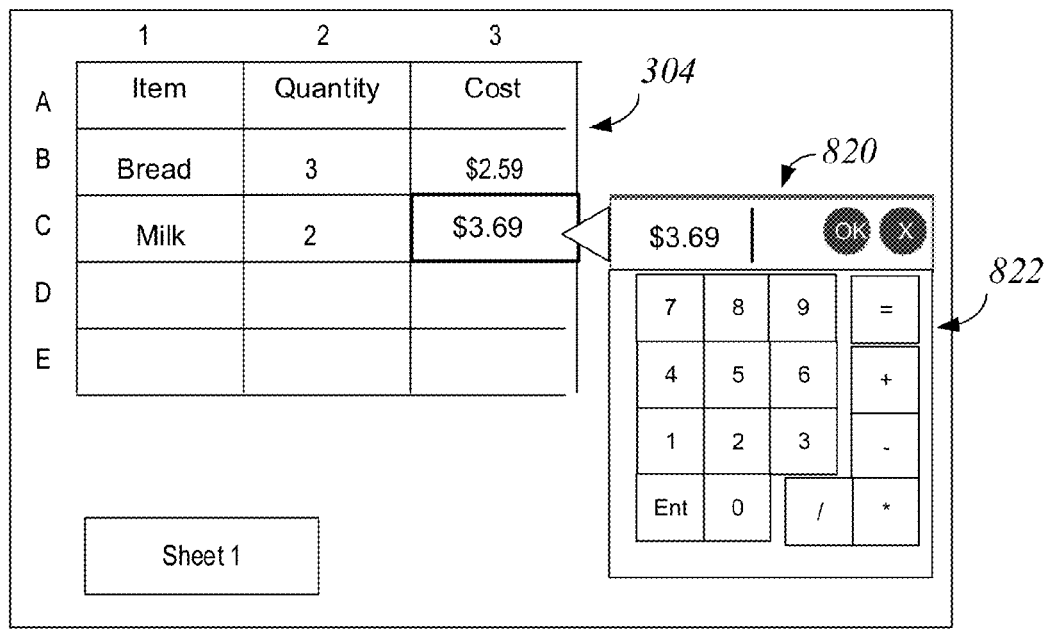
FIG. 8A-B illustrate an embodiment of a sixth user interface view for the system of FIG. 1.
Figure 8B:
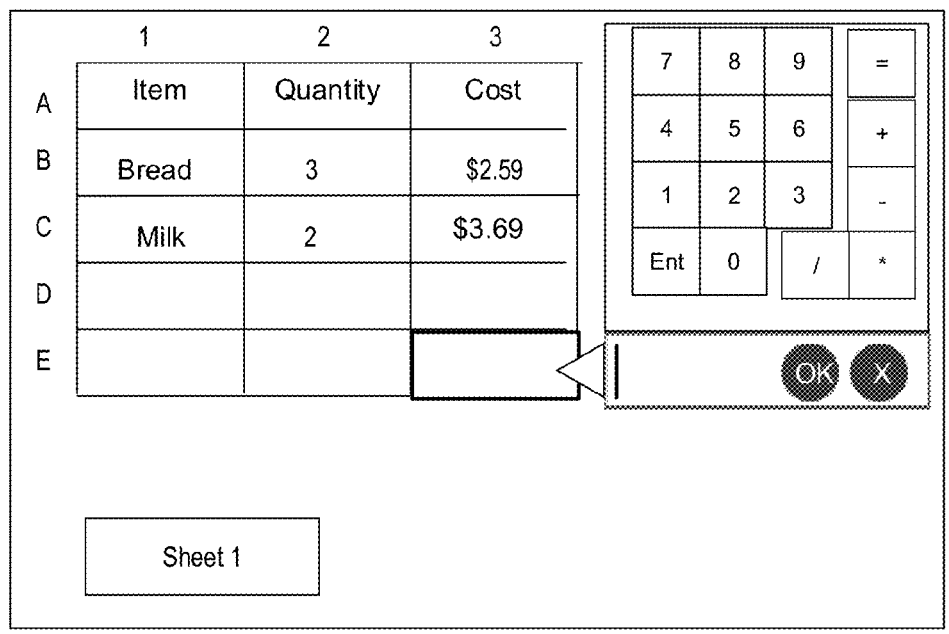

FIG. 8A-B illustrate an embodiment of a sixth user interface view 800 for the system of FIG. 1. FIGS. 8A-B illustrate a floating formula bar UI element 820 (hereinafter "formula bar 820") and a numeric keypad UI element 822 ("keypad 822"). FIGS. 8A-B illustrate dynamic positioning of keypad 822 with respect to grid 304.

FIG. 8A illustrates grid 304 with formula bar 820 adjacent to the right of selected cell C3. In addition, keypad 822 is displayed coupled to and below formula bar 820. Keypad 822 may include UI elements on a display that are analogous to a hardware numeric keypad or calculator. The "keys" on keypad 822 may be selectable on a touch sensitive display by a finger or stylus touch, or by a conventional mouse or track pad selection, or by keys on an actual physical keyboard. More or fewer keys may be displayed as part of keypad 822. Of note in this example is that the value of cell C3 is a manually entered value, that is, the value was entered as "$3.69" rather than calculated. Formula bar 820 may display the actual value, rather than the formula to calculate a value, in this case.

FIG. 8B reflects a dynamic repositioning of keypad 822 when formula bar 820 moves with respect to grid 304 and/or with respect to the top and bottom borders of the display. In FIG. 8B, formula bar 820 has moved downward to be associated with cell E3 and is positioned close to the bottom border of the display. When there is insufficient space to display keypad 822 below formula bar 820, keypad 822 may be moved above formula bar 820 as shown.

FIG. 9A-B illustrate an embodiment of a seventh user interface view 900 for the system of FIG. 1. FIGS. 9A-B illustrate dynamically adjusting the width of a docked formula bar UI element in response to a control directive received on a UI element in the dock.

FIG. 9A is similar to FIG. 6B. However, the spreadsheet 902 shown in FIG. 9A has at least two sheets, as indicated by tabs 904 and 906. In the example, sheet 1 is the active sheet and is shown on top of sheet 2. Formula bar UI element 920 ("formula bar 920") is docked next to tab 906. Formula bar 920 has some content, namely a formula.

FIG. 9B illustrates what may occur when additional text is entered into a formula bar UI element. In FIG. 9B, additional parameters are entered into the entry field of formula bar 920, making the overall length of the text in the entry field longer. In order to display as much of the formula (or other text) as possible, the length of formula bar 920 may be extended. In order to accommodate the additional length, the length of one or more tabs, e.g. tab 906, may be decreased. In an embodiment, tab 906 may be accessed by a selecting control directive, which may re-expand the tab and shrink formula bar 920 accordingly.

Dynamic expansion of a formula bar UI element is not restricted to docked formula bars. Floating formula bar UI elements may also expand to show larger entry fields and their contents.

Embodiments may allow the formula bar UI element to be docked to any of: a permanent UI element, a semi-permanent UI element, and a floating UI element, in response to a docking control directive. A permanent UI element may represent a UI element that is always present in a context of the spreadsheet, for example, a tab. A semi-permanent UI element may represent a UI element that can be enabled or disabled within a context of the spreadsheet, but that stays enabled/disabled until disabled/enabled by the operator, e.g. a toolbar. A floating UI element may represent a UI element that is not attached to a permanent or semi-permanent UI element, and that appears to float above other UI elements in the spreadsheet.

FIG. 10 illustrates an embodiment of an eight user interface view 1000 for the system of FIG. 1. UI view 1000 shows a formula bar UI element 1020 ("formula bar 1020") docked below the grid 1002 and above a soft keyboard 1030. UI view 1000 may be used, for example, on a tablet device. Soft keyboard 1030 may be operative to received touch input on a display to enter input into formula bar 1020. Docking formula bar 1020 just above (or just below) a soft keyboard on display may reduce the amount and size of motions that an operator makes in interacting with formula bar 1020.

Figure 11:
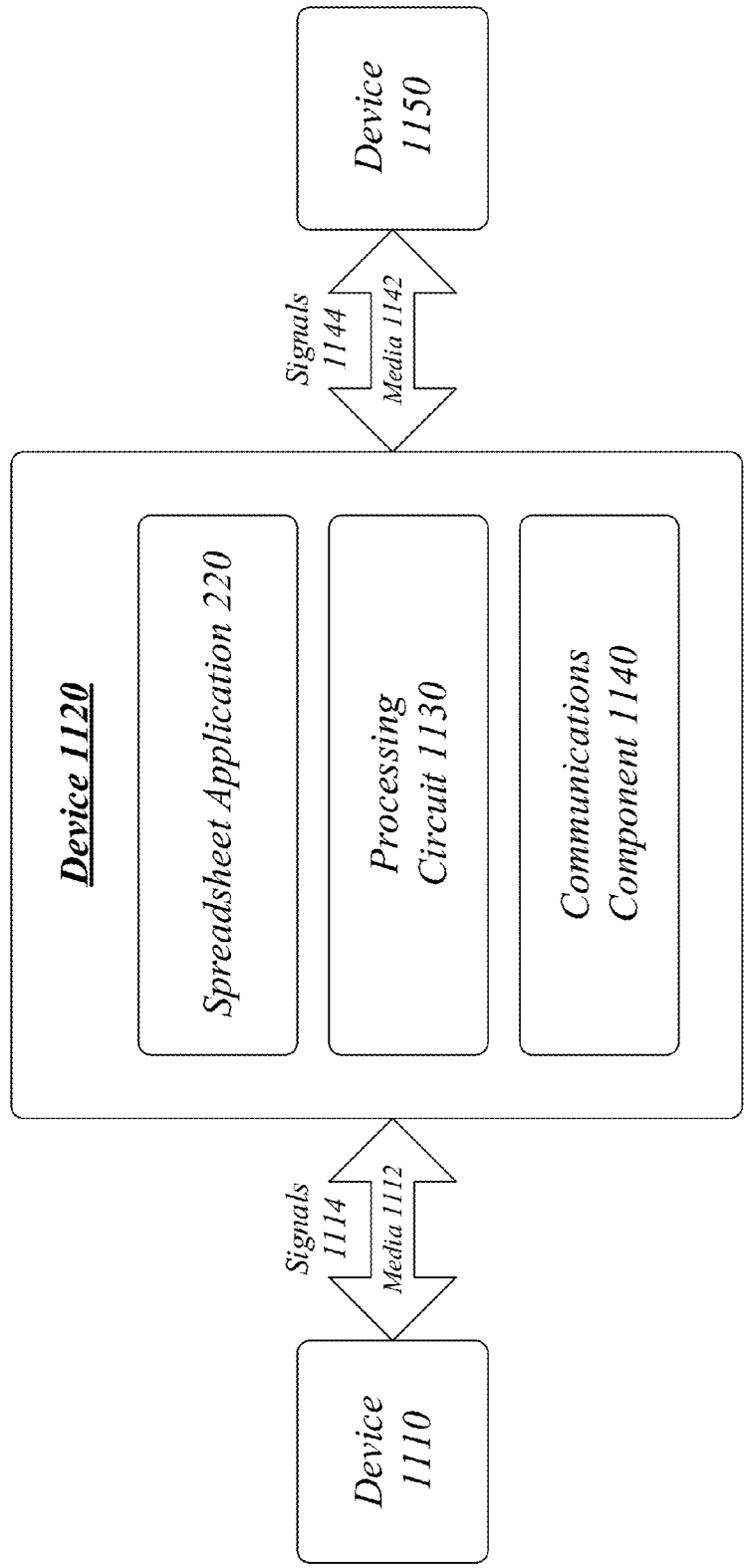
FIG. 11 illustrates an embodiment of a centralized system for the system of FIG. 1.

FIG. 11 illustrates a block diagram of a centralized system 1100. The centralized system 1100 may implement some or all of the structure and/or operations for the spreadsheet application 220 in a single computing entity, such as entirely within a single device 1120.

The device 1120 may comprise any electronic device capable of receiving, processing, and sending information for the spreadsheet application 220. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 1120 may execute processing operations or logic for the online community 110 using a processing circuit 1130. The processing circuit 1130 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1120 may execute communications operations or logic for the spreadsheet application 220 using communications component 1140. The communications component 1140 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1140 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1112, 1142 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1120 may communicate with other devices 1110, 1150 over a communications media 1112, 1142, respectively, using communications signals 1114, 1144, respectively, via the communications component 1140. The devices 1110, 1150 may be internal or external to the device 1120 as desired for a given implementation. Devices 1110 and 1150 may represent clients or servers, e.g. server device 150, and/or other sources of spreadsheet files 130 or spreadsheet application components.

Figure 12:
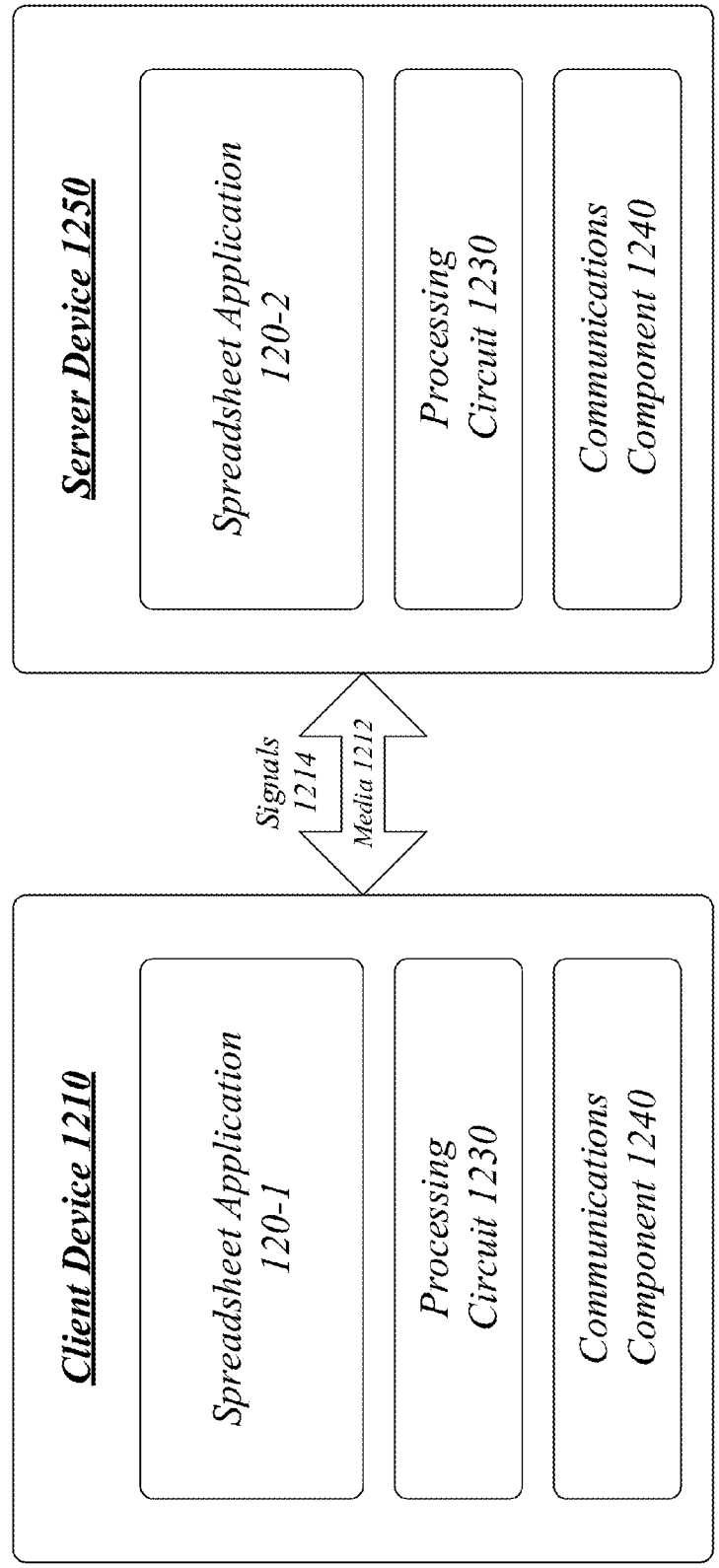
FIG. 12 illustrates an embodiment of a distributed system for the system of FIG. 1.

FIG. 12 illustrates a block diagram of a distributed system 1200. The distributed system 1200 may distribute portions of the structure and/or operations for the system 100 across multiple computing entities. Examples of distributed system 1200 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1200 may comprise a client device 1210 and a server device 1250. In general, the client device 1210 and the server device 1250 may be the same or similar to the client device 1120 as described with reference to FIGS. 1 and 11. For instance, the client device 1210 and the server device 1250 may each comprise a processing circuit 1230 and a communications component 1240 which are the same or similar to the processing circuit 1130 and the communications component 1140, respectively, as described with reference to FIG. 11. In another example, the devices 1210, 1250 may communicate over a communications media 1212 using communications signals 1214 via the communications components 1240.

The client device 1210 may comprise or employ one or more client programs that operate to perform various methodologies in accordance with the described embodiments. In one embodiment, for example, the client device 1210 may implement spreadsheet application 120-1.

The server device 1250 may comprise or employ one or more server programs that operate to perform various methodologies in accordance with the described embodiments. In one embodiment, for example, the server device 1250 may implement server device 150.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 13 illustrates one embodiment of a logic flow 1300. The logic flow 1300 may be representative of some or all of the operations executed by one or more embodiments described herein.

In the illustrated embodiment shown in FIG. 13, logic flow 1300 may present a grid comprising cells on a display at block 1302. For example, SS UI component 230 may present a spreadsheet 302 on a display 104 having a grid 304.

Logic flow 1300 may receive a control directive selecting a cell at block 1304. For example, SS UI component 230 may receive a double-click, a touch, a double-tap touch, a key entry, and so forth to select the cell for data entry.

Logic flow 1300 may display a formula bar UI element adjacent to the selected cell in block 1306. For example, SS UI component 230 may use formula bar interface component 240 to display a formula bar UI element 242 above, below, to the left of or to the right of the selected cell, without obscuring the selected cell. In an embodiment, the formula bar UI element may include a visual indicator to show which cell the formula bar UI element is currently associated with.

Logic flow 1300 may accept input to the cell from the formula bar UI element at block 1308. For example, SS UI component 230 may receive input from a physical keyboard, a soft keyboard, a numeric keypad, a voice input, a gesture input or any other method of providing alphanumeric characters into the entry field of the formula bar UI element.

Figure 14:
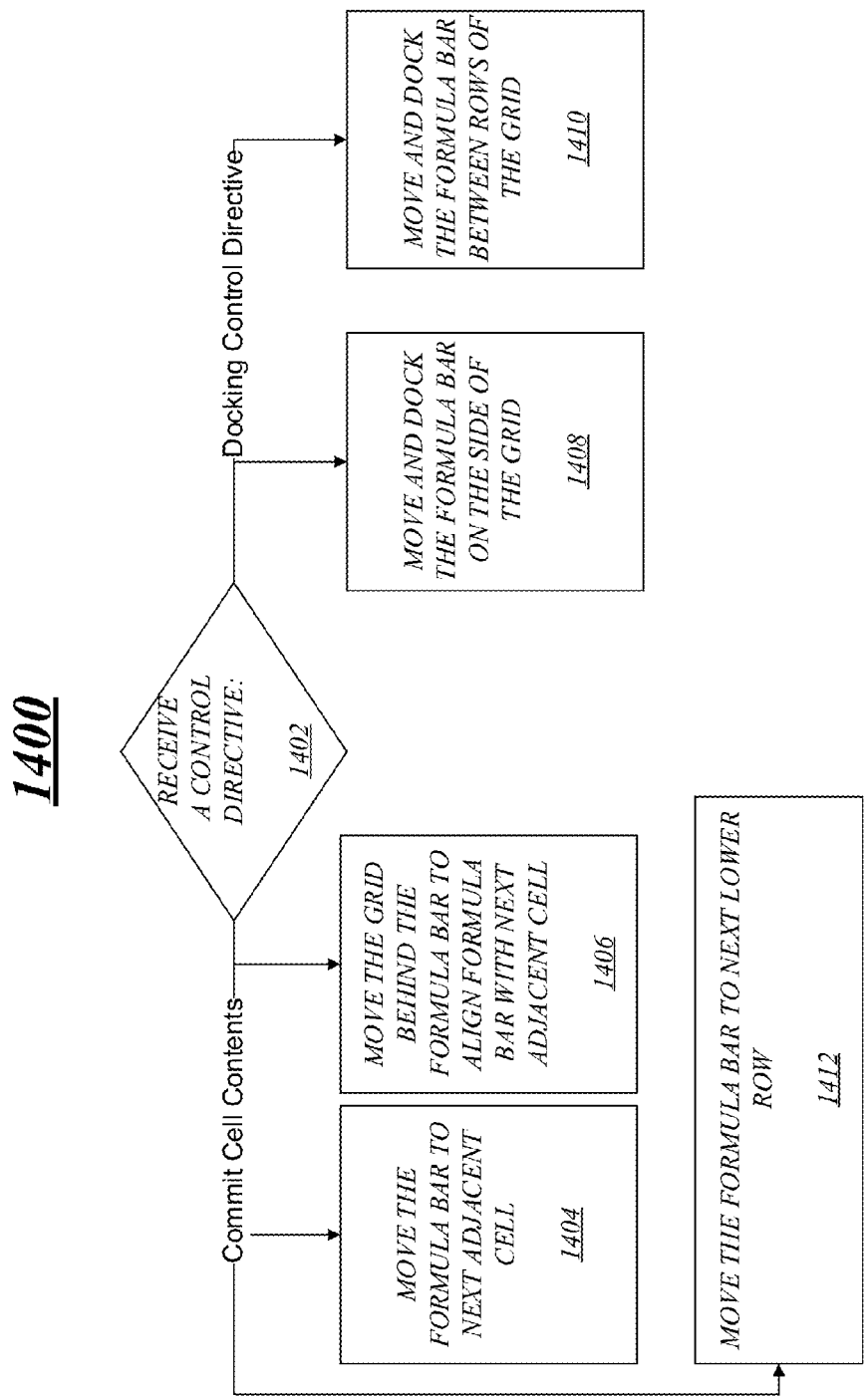
FIG. 14 illustrates an embodiment of a logic flow for the system of FIG. 1.

FIG. 14 illustrates one embodiment of a logic flow 1400. The logic flow 1400 may be representative of some or all of the operations executed by one or more embodiments described herein. Logic flow 1400 may represent various actions that may occur in response to receiving a control directive related to a formula bar UI element.

In the illustrated embodiment shown in FIG. 14, the logic flow 1400 may receive a control directive at block 1402. The control directive may be, as previously discussed, any input received by client device 110 from operator 108. The control directive may be received as touch via a touch-sensitive display or input device, or from any variety of hardware input devices such as keyboards, mice, touch pads, track pads, microphones, video cameras, and the like. The type of the control directive and the context of the formula bar UI element 242 may determine a response.

For example, when the control directive is a committing control directive to formula bar UI element 242 ("formula bar 242"), logic flow 1400 may move formula bar 242 to a next adjacent cell in block 1404, as illustrated, for example, by FIGS. 4A-B.

Alternatively, logic flow 1400 may scroll or pan the grid behind formula bar 242 to align the formula bar with a next adjacent cell in block 1406, as illustrated, for example, in FIGS. 5A-B.

When the control directive is a docking control directive, logic flow 1400 may move and dock formula bar 242 on a side of the grid in block 1408, as illustrated, for example, in FIGS. 6A-C. Formula bar 242 may also be docked to any other UI element.

Alternatively, logic flow 1400 may move and dock formula bar 242 between rows of the grid in block 1410, as illustrated, for example, by FIG. 7A. When formula bar 242 is docked between rows, and logic flow 1400 receives a committing control directive at block 1402, formula bar 242 may be moved to a next lower row in block 1412.

While the illustrated embodiments have shown one floating formula bar, some embodiments may allow multiple floating formula bars, each associated with a different cell.

Figure 15:
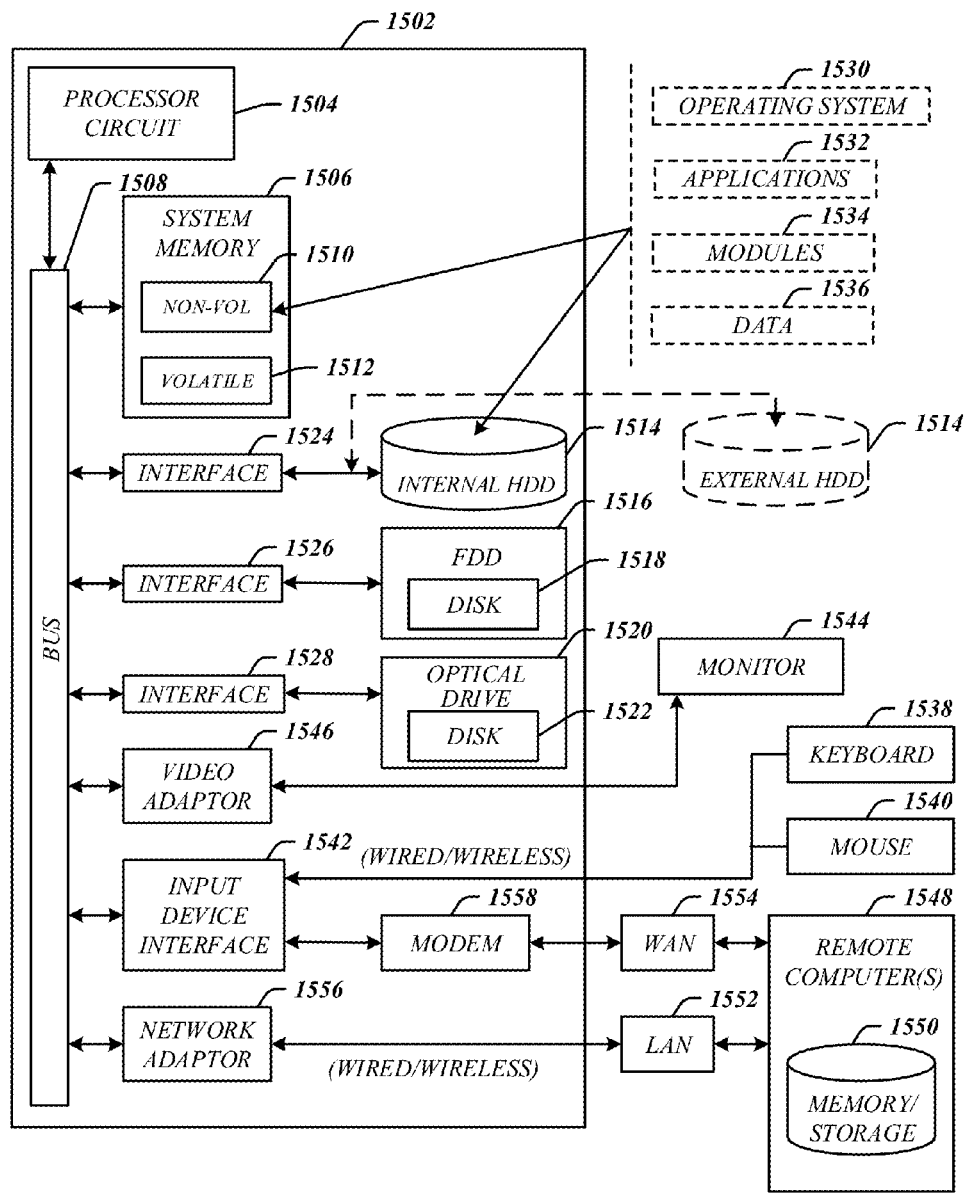
FIG. 15 illustrates an embodiment of a computing architecture.

FIG. 15 illustrates an embodiment of an exemplary computing architecture 1500 suitable for implementing various embodiments as previously described. In one embodiment, the computing architecture 1500 may comprise or be implemented as part of an electronic device. Examples of an electronic device may include those described with reference to FIG. 11, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1500.

As shown in FIG. 15, the computing architecture 1500 comprises a processing circuit 1504, a system memory 1506 and a system bus 1508. The processing circuit 1504 can be any of various commercially available hardware processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing circuit 1504.

The system bus 1508 provides an interface for system components including, but not limited to, the system memory 1506 to the processing circuit 1504. The system bus 1508 can be any of several types of bus structure that may further interconnect to a memory bus (with or without a memory controller), a peripheral bus, and a local bus using any of a variety of commercially available bus architectures. Interface adapters may connect to the system bus 1508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1500 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a computer-readable medium that does not include signals or carrier waves, which may be read and executed by one or more processors to enable performance of the operations described herein.

The system memory 1506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 15, the system memory 1506 can include non-volatile memory 1510 and/or volatile memory 1512. A basic input/output system (BIOS) can be stored in the non-volatile memory 1510.

The computer 1502 may include various types of computer-readable storage media in the form of one or more lower speed memory units, including an internal (or external) hard disk drive (HDD) 1514, a magnetic floppy disk drive (FDD) 1516 to read from or write to a removable magnetic disk 1518, and an optical disk drive 1520 to read from or write to a removable optical disk 1522 (e.g., a CD-ROM or DVD). The HDD 1514, FDD 1516 and optical disk drive 1520 can be connected to the system bus 1508 by a HDD interface 1524, an FDD interface 1526 and an optical drive interface 1528, respectively. The HDD interface 1524 for external drive implementations can include at least one or both of Universal Serial Bus (USB) and IEEE 1494 interface technologies.

The drives and associated computer-readable media provide volatile and/or nonvolatile storage of data, data structures, computer-executable instructions, and so forth. For example, a number of program modules can be stored in the drives and memory units 1510, 1512, including an operating system 1530, one or more application programs 1532, other program modules 1534, and program data 1536. In one embodiment, the one or more application programs 1532, other program modules 1534, and program data 1536 can include, for example, the various applications and/or components of the system 100.

A user can enter commands and information into the computer 1502 through one or more wire/wireless input devices, for example, a keyboard 1538 and a pointing device, such as a mouse 1540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing circuit 1504 through an input device interface 1542 that is coupled to the system bus 1508, but can be connected by other interfaces such as a parallel port, IEEE 1494 serial port, a game port, a USB port, an IR interface, and so forth.

A monitor 1544 or other type of display device is also connected to the system bus 1508 via an interface, such as a video adaptor 1546. The monitor 1544 may be internal or external to the computer 1502. In addition to the monitor 1544, a computer typically includes other peripheral output devices, such as speakers, printers, and so forth.

The computer 1502 may operate in a networked environment using logical connections via wire and/or wireless communications to one or more remote computers, such as a remote computer 1548. The remote computer 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wire/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the LAN 1552 through a wire and/or wireless communication network interface or adaptor 1556. The adaptor 1556 can facilitate wire and/or wireless communications to the LAN 1552, which may also include a wireless access point disposed thereon for communicating with the wireless functionality of the adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wire and/or wireless device, connects to the system bus 1508 via the input device interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 16:
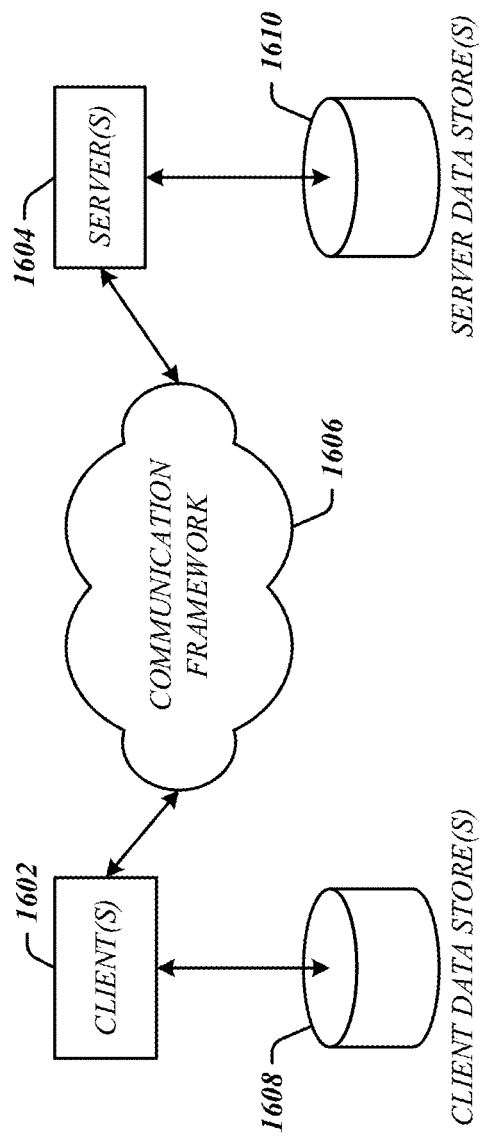
FIG. 16 illustrates an embodiment of a communications architecture.

FIG. 16 illustrates a block diagram of an exemplary communications architecture 1600 suitable for implementing various embodiments as previously described. The communications architecture 1600 includes various common communications elements, such as a transmitter, receiver, transceiver, radio, network interface, baseband processor, antenna, amplifiers, filters, power supplies, and so forth. The embodiments, however, are not limited to implementation by the communications architecture 1600.

As shown in FIG. 16, the communications architecture 1600 comprises includes one or more clients 1602 and servers 1604. The clients 1602 may implement the client device 1210. The servers 1604 may implement the server device 1250. The clients 1602 and the servers 1604 are operatively connected to one or more respective client data stores 1608 and server data stores 1610 that can be employed to store information local to the respective clients 1602 and servers 1604, such as cookies and/or associated contextual information.

The clients 1602 and the servers 1604 may communicate information between each other using a communication framework 1606. The communications framework 1606 may implement any well-known communications techniques and protocols. The communications framework 1606 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1606 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1602 and the servers 1604. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a processor circuit; and
a spreadsheet user interface (UI) component executing on the processor circuit to:
display a grid comprising cells arranged in rows and columns;
receive a control directive selecting a first cell from the grid and in response to receiving the control directive selecting the first cell, use a formula bar interface component to display a formula bar UI element in a row other than a row of the first cell and within the displayed grid, wherein the formula bar UI element further performs at least one of displaying current content of the first cell or accepts input to the first cell, wherein the formula bar interface component is to further display the formula bar UI element with a visual indicator that indicates the formula bar UI element is to display the current content for the first cell by displaying a connection between the formula bar UI element and the row of the first cell.

2. The apparatus of claim 1, the formula bar interface component further to:
move the formula bar UI element to a second cell adjacent to the first cell when the contents of the first cell are committed.

3. The apparatus of claim 1, the spreadsheet UI component further to:
scroll or pan the grid behind the formula bar UI element upon the contents of the first cell being committed such that the formula bar UI element remains at a fixed location relative to the display and connected to a second cell adjacent to the first cell.

4. The apparatus of claim 1, the formula bar interface component further to:
receive a docking control directive; and
move the formula bar UI element to a docked location at a side of the grid in response to the docking control directive.

5. The apparatus of claim 1, the formula bar interface component further to:
dock the formula bar UI element between the first row of the grid and a second row of the grid.

6. The apparatus of claim 1, the formula bar interface component further to:
display a numeric keyboard UI element coupled to the formula bar; and
receive input to the formula bar UI element from the numeric keyboard UI element.

7. The apparatus of claim 6, the formula bar interface component further to:
position the numeric keyboard UI element dynamically relative to the formula bar UI element and a position on a display.

8. A computer-implemented method, comprising:
presenting on a display, by a processor circuit, a grid comprising cells arranged in rows and columns;
receiving a control directive selecting a first cell in a row from the presented grid;
displaying in response to the received control directive, a formula bar user interface (UI) element in a row other than the row of the first cell and within the presented grid, wherein the formula bar UI element further performs at least one of displaying content of the first cell or accepts input to the first cell;

displaying a visual indicator forming a connection between the formula bar UI element and the row of the first cell to indicate the formula bar UI element is to display the content for the first cell; and accepting input to the first cell from the formula bar UI element.

9. The computer-implemented method of claim 8, comprising:

displaying a calculated value in the selected first cell, wherein the value is calculated from a formula received as input to the formula bar UI element.

10. The computer-implemented method of claim 8, comprising:

moving the grid when the contents of the first cell are being committed such that the formula bar UI element remains at a fixed location relative to the display and connected to a second cell adjacent to the first cell.

11. The computer-implemented method of claim 10, comprising:

receiving a docking control directive; and moving the formula bar UI element to a docked location at a side of the grid in response to the docking control directive.

12. The computer-implemented method of claim 10, comprising:

docking the formula bar UI element between the first row of the grid and a second row of the grid, wherein the first cell is in one of the first row or the second row; and moving the docked formula bar UI element to a next lower row when the contents of the first cell are being committed.

13. The computer-implemented method of claim 8, displaying a numeric keyboard UI element coupled to the formula bar; and receive input to the formula bar UI element from the numeric keyboard UI element.

14. The computer-implemented method of claim 13, position the numeric keyboard UI element dynamically relative to the formula bar UI element and a position on a display.

15. Computer-readable storage hardware comprising a tangible medium to store instructions that, when executed, cause a system to:

present, on a display, a grid comprising cells arranged in rows and columns;

receive a control directive selecting a first cell from the grid;

insert a row into the grid and display a formula bar user interface (UI) element within the inserted row of the grid in response to receiving the control directive selecting the first cell, wherein the formula bar UI element further performs at least one of displaying content of the first cell or accepts input to the first cell;

accept input to the first cell from an entry field in the formula bar UI element; and move the formula bar UI element upon commitment of the input to the first cell such that the formula bar UI element remains within the grid.

16. The computer-readable storage hardware of claim 15, comprising instructions that when executed cause the system to:

expand the size of the entry field to display an entirety of the input.

17. The computer-readable storage hardware of claim 15, comprising instructions that when executed cause the system to:

dock the formula bar UI element to one of: a permanent UI element, a semi-permanent UI element, and a floating UI element, in response to a docking control directive; and dynamically adjust the width of the formula bar UI element in response to a control directive received on at least one of: the formula bar UI element and a UI element that the formula bar is docked to.

18. The computer-readable storage hardware of claim 15, comprising instructions that when executed cause the system to:

dock the formula bar UI element between the first row of the grid and a second row of the grid, wherein the first cell is in one of the first row or the second row; and move the docked formula bar UI element to a next lower row upon the contents of the first cell being committed.

19. The computer-readable storage hardware of claim 15, comprising instructions that when executed cause the system to:

move the formula bar UI element adjacent to a second cell adjacent to the first cell when the contents of the first cell are being committed.

20. The computer-readable storage hardware of claim 15, comprising instructions that when executed cause the system to:

display a numeric keyboard UI element coupled to the formula bar UI element;

position the numeric keyboard UI element dynamically relative to the formula bar UI element and a position on a display; and receive input to the formula bar UI element from the numeric keyboard UI element.

* * * * *